Nov. 19, 1946.  W. H. VAN GAASBEEK  2,411,306
PELORUS
Filed Jan. 20, 1944  4 Sheets-Sheet 1

INVENTOR.
WILLIAM H. VAN GAASBEEK,
BY
ATTORNEY

Nov. 19, 1946.  W. H. VAN GAASBEEK  2,411,306
PELORUS
Filed Jan. 20, 1944  4 Sheets-Sheet 2

INVENTOR.
WILLIAM H. VAN GAASBEEK,
BY
ATTORNEY

Nov. 19, 1946.  W. H. VAN GAASBEEK  2,411,306
PELORUS
Filed Jan. 20, 1944  4 Sheets-Sheet 3
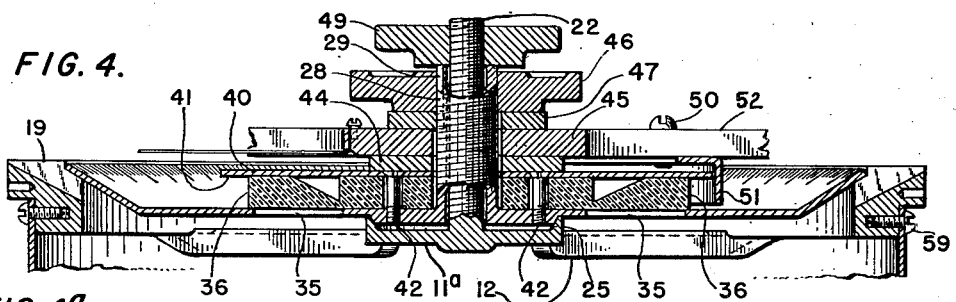
FIG. 4.
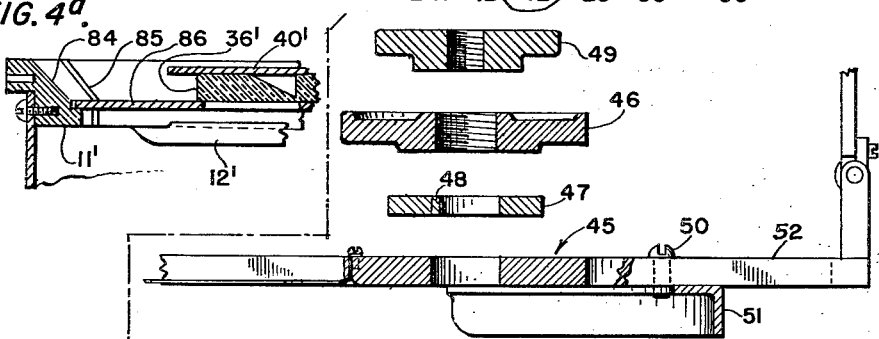
FIG. 4ª.
FIG. 5.
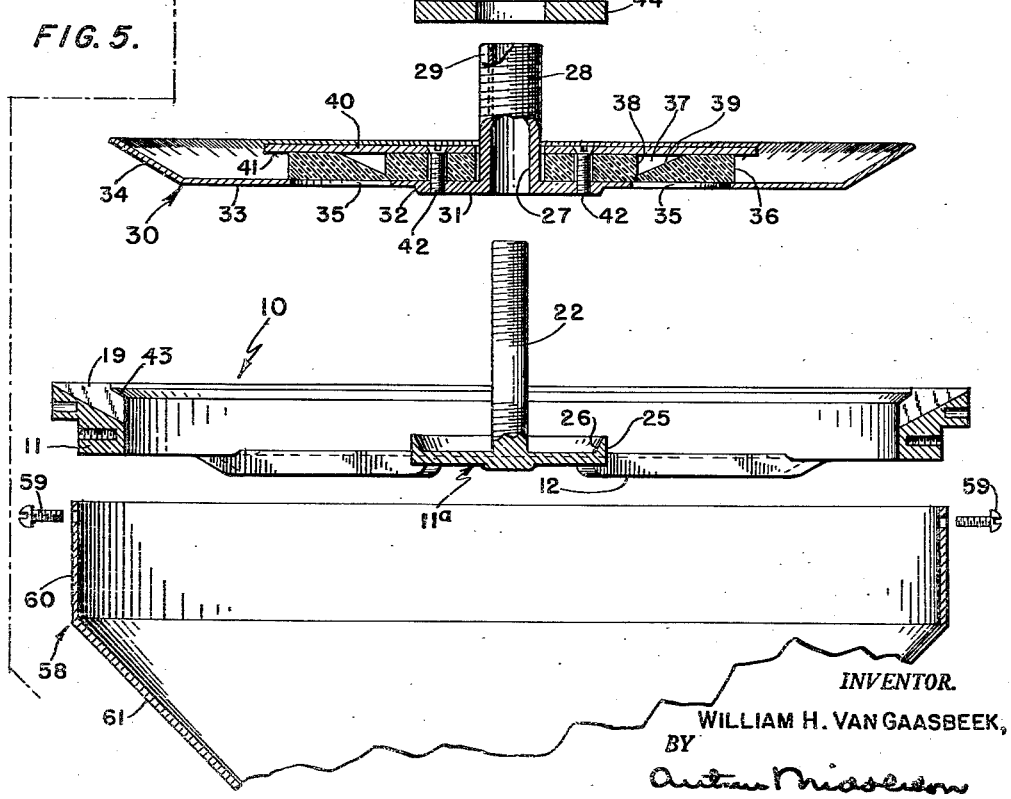
INVENTOR.
WILLIAM H. VAN GAASBEEK,
BY
ATTORNEY Nov. 19, 1946.　　W. H. VAN GAASBEEK　　2,411,306
PELORUS
Filed Jan. 20, 1944　　4 Sheets-Sheet 4
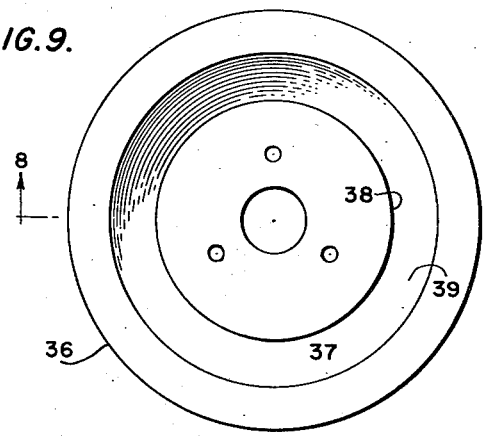
FIG. 9.
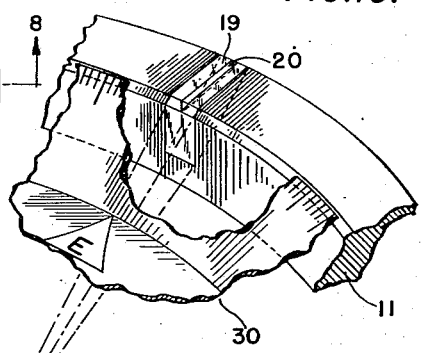
FIG. 10.
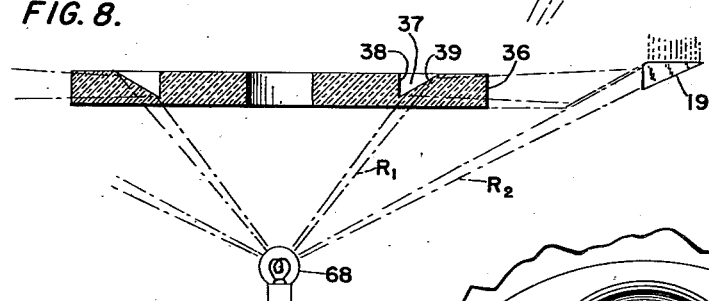
FIG. 8.
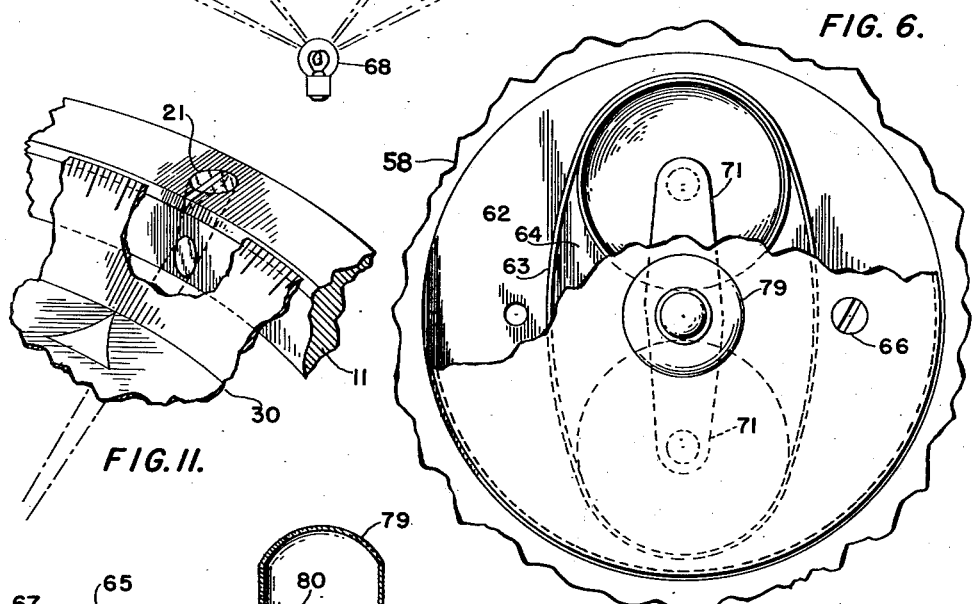
FIG. 11.
FIG. 6.
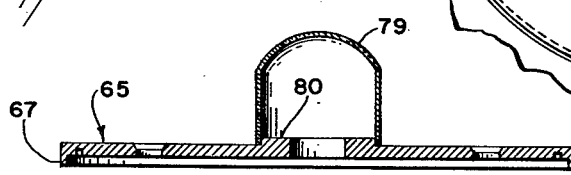
FIG. 7.
INVENTOR.
WILLIAM H. VAN GAASBEEK,
BY
ATTORNEY Patented Nov. 19, 1946

2,411,306

UNITED STATES PATENT OFFICE 2,411,306

PELORUS

William H. Van Gaasbeek, Short Hills, N. J.

Application January 20, 1944, Serial No. 519,011

10 Claims. (Cl. 240—2.1)

This invention relates to a nautical instrument known as a pelorus by means of which the navigator of a vessel can take its bearings through a sighting device, the so-called "alidade" which is rotatable over a horizontal reference dial.

More specifically, this invention relates to means for lighting the pelorus dial for night observation.

It is among the objects of this invention to provide lighting means for a non-transparent dial, which means are outwardly substantially non-revealing, and yet make possible a clear, accurate, and convenient reading of the dial; whereby the observer is not blinded by the light; and which means are sturdy and shatterproof. Another object is to provide means in association with a non-transparent dial, which make possible clear readings for day as well as night observation.

A pelorus usually comprises an annular frame upon which the dial is mounted in such a manner that it can be rotatably adjusted and fixed relative to the "lubber lines" or other reference marks provided on the frame.

It is further among the objects to brighten the fixed markings or lubber lines for night observation.

Some of the objects involving the brightening of the non-transparent dial member are attained by providing upwardly shielded light passage means effective to pass indirect light onto the dial either by way of the central portion or from the margin of the dial member.

More specifically, such objects are attained by having a light penetrable member associated with the dial member and with a light source disposed underneath the dial member in such a manner as to allow light to pass from the source through a light penetrable member onto the dial.

According to one feature, brightening of the dial is attained by providing a light source underneath the dial and upwardly shielded light passage means at the center portion of the dial and disposed underneath the alidade, which means are effective to throw indirect light radiating across or onto the non-transparent dial, the dial having a dished or conical marginal portion in the path of the indirect light brightening the dial graduations.

According to another feature, a light penetrable or conducting medium is associated with centrally disposed light passage means of the dial, to direct light onto the dial.

According to another feature, a light deflecting or breaking conical surface is associated with centrally disposed light passage means, to direct the light onto the dial.

According to a structurally more fully defined feature, centrally disposed light passage means comprise a light penetrable or substantially transparent or translucent flat or disc-like element interposed between the dial and a shielding plate; in a more specific embodiment the combination of dial, transparent element and shielding plate constitute a unit or sub-assembly unit, these parts being connected or fixed with respect to one another.

The object of brightening the reference marks or lubber lines is attained by providing transparent or translucent insert portions in the frame illuminated from underneath.

According to one feature, a translucent or transparent portion of the frame bears on it the respective reference mark in such a manner as to appear dark against a luminous background at night.

According to another feature, the lubber lines or fixed markings are illuminated due to their being placed upon the annular frame portion so that they will also be in the path of the light being thrown onto the dial from the central portion thereof.

Other features relate to the means providing a light source in the pelorus. In a specific embodiment the light source is self-contained and unitary with the pelorus, in that one or a plurality of dry cell batteries are unitary with the pelorus, for lighting an electric bulb serving as the light source.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Figure 1 is a perspective view of a pelorus embodying improvements of the invention.

Figure 4 is an enlarged sectional view of the dial portion and associated parts.

Figure 4a is a modification of the dial arrangement of Fig. 4.

Figure 5 shows the parts of Fig. 4 drawn apart.

Figure 6 is a cross sectional view taken along the lines 6—6 in Fig. 3.

Figure 7 shows a detailed portion of the lighting fixture embodied in the device.

Figures 8 and 9 are sectional and plan view respectively of a disc-like translucent element in its relation to the light source underneath, illustrating how the light is directed therethrough.

Figures 10 and 11 are enlarged perspective detailed portions illustrating two modifications in the arrangement of the illuminated lubber lines or reference marks on the frame.

Figure 1:
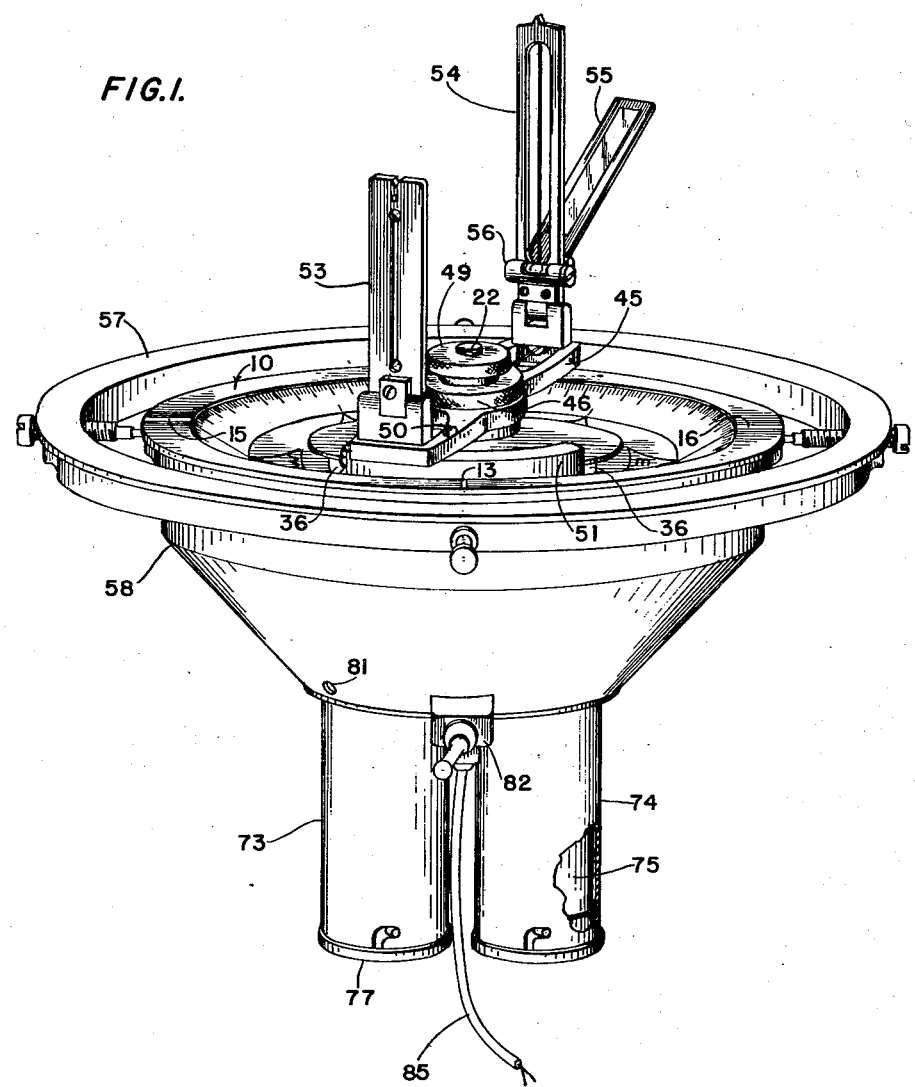
Figure 2:
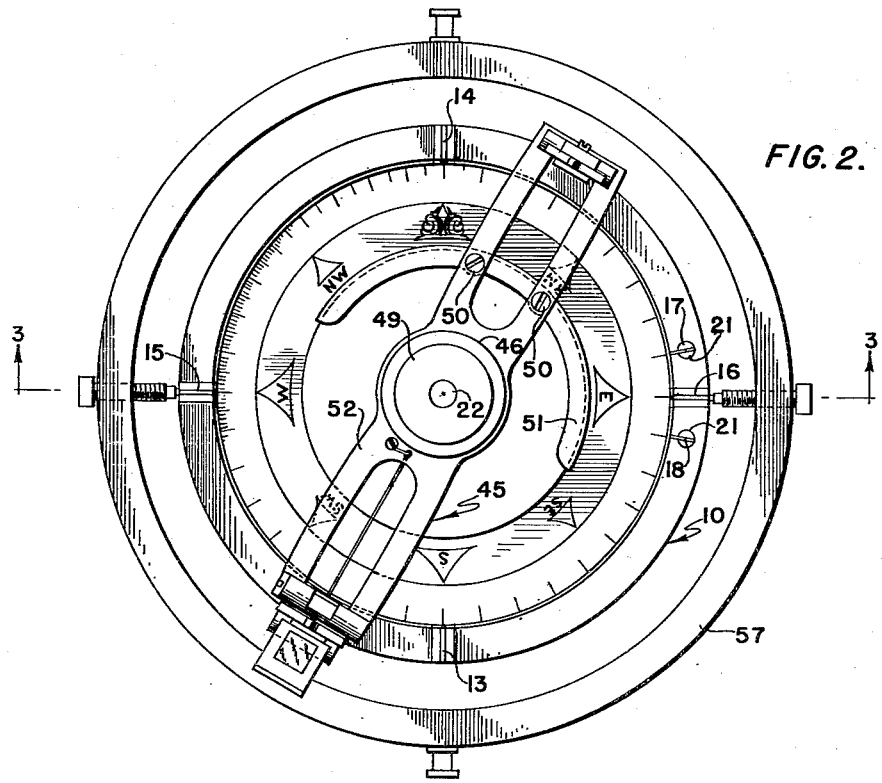
Figure 2 is a top view of the device shown in Fig. 1.
Figure 3:
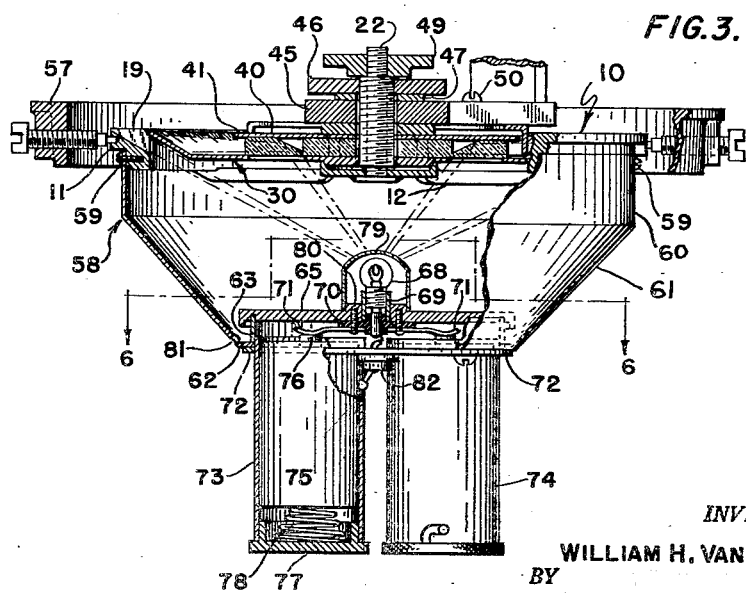
Figure 3 is a longitudinal part sectional view of the pelorus shown in Fig. 1.

The pelorus as shown in Figures 1, 2, 3, comprises a frame 10 having a rim portion 11, a hub portion 11a, and radial arms 12 connecting the rim portion with the hub portion (see also Figures 4 and 5). The rim portion 11 is shown to bear markings such as the lubber lines 13, 14, 15, 16, as well as a pair of auxiliary markings 17 and 18 straddling the lubber line 16. The lubber lines proper are each marked on an insert portion 19 of transparent or translucent material, for instance, a composition such as "Lucite," fitted into a corresponding recess of the rim portion 11. The insert portion 19 thus fits into the contours of the rim portion (see also Fig. 10), and is shown to be provided with a radial groove or notch 20 filled with suitable material or paint to indicate the lubber line proper. However, the lubber line may also be marked in some other suitable manner on the insert portion. Each of the auxiliary markings 17 and 18 (see also Fig. 11) are placed upon a translucent slightly conical insert portion 21 fitted into a correspondingly shaped hole extending somewhat diagonally and downwardly through the rim portion 11. This auxiliary insert portion also fits itself into the contours of the rim portion 11. The hub portion 11a has a marginal circular seat portion 25 provided with an internal circular seating face 26.

From the hub portion 11a rises a stud 22 fixed thereto. Over the stud 22 fits loosely a sleeve portion 27 having external thread 28 and a vertical external key groove 29. This sleeve member 27 is fixed to and constitutes in turn the hub portion of a dial member 30 having a center portion 31 provided with an outer circular bevel face 32 seatable upon the inner bevel face 26 of hub portion 11a. The dial member as shown has a horizontal or flat body portion 33 and an outer conical portion 34 upon which are marked the graduations of the circle. The flat portion 33 of the dial has light passage openings 35 of adequate size. Overlying the light passage openings is a disc-like member 36 of transparent or translucent or light conducting material having on the upper side a circular groove 37 defined by the vertical face 38 and the conical face 39 which latter serves as a light-deflecting face in a manner that will be further described.

Covering the disc-like light penetrable member 36 is an opaque round shielding plate 40 shown to be of larger diameter than the light conducting disc, so as to provide an overhanging marginal portion 41. The dial member 30, the light-conducting disc-like member 36, and the shielding plate 40 are held together as a sub-assembly unit by screws 42. As the central portion of the dial member 30 seats onto the hub portion 11a, the conical marginal portion will come to rest upon a corresponding conical seating face 43 upon the rim portion 11.

Further surrounding the sleeve portion 27 is a washer 44 upon which rests the rotatable sighting device or so-called alidade 45 which is swingable with respect to the dial member, but can be fixed in a set position relative to the dial by tightening a thumb nut 46. A key washer 47 is interposed between the alidade 45 and the thumb nut 46, the key 48 of the washer engaging in the vertical groove 29 of sleeve portion 27.

The dial member 30 is rotatably adjustable about the stud 22, but can be fixed in adjusted position by tightening up on a second thumb nut 49 which fits the thread on stud 22. The nut 49 when tightened engages the top end of the sleeve portion 27 fixing the dial member in an adjusted position relative to the lubber lines on frame 10.

Loosening the upper thumb nut 49 while the lower thumb nut 46 is tight, leaves the alidade locked to the dial member by way of the threaded sleeve portion 27. That is to say, the dial member 30 and the alidade are then rotatable as a unit about the stud 22. Loosening of the lower thumb nut 46 and tightening of the upper thumb nut 49 fixes the dial member on the frame 10, leaving the alidade 45 free to be turned in taking the sight. The alidade can then be fixed in the sighting position by tightening the nut 46. To the underside of the alidade is attached by means of screws 50 a light shielding skirt 51 extending over about half the circumference of the light emitting space between the dial and the shielding plate 40.

The alidade 45 itself is of a known construction comprising the beam 52, the hinged sighting member 53 on one end of the beam, the opposite sighting member 54 hinged on the other end of the beam together with the hinged sky mirror 55, and the balance 56. The frame 10 is shown to be suspended in a gimbal ring 57.

Surrounding the frame 10 at the underside is a casing 58 fastened to the frame 10 as by screws 59, and comprising a cylindrical portion 60, a conical portion 61, and a bottom portion 62. The bottom portion 62 has an inwardly and upwardly crimped portion or neck portion 63 constituting an oval opening 64 (see also Fig. 6) in the bottom of the casing. This opening is closed by a cover plate 65 held down to the bottom of the casing as by screws 66, and provided with a marginal skirt portion 67. In this cover plate is mounted a lighting fixture comprising an electric bulb 68, a socket 69 therefor, an insulating member 70, and a pair of contact springs 71. Attached or fixed to the bottom of the casing is a plate or mounting 72 having a pair of cylindrical hollow portions or pockets 73 and 74, each of said pockets adapted to receive and hold a dry cell battery 75 having at the top a contact 76 engaging contact spring 71, and removable from the pocket by reason of a removable bottom element 77 of the pocket. A coiled spring 78 is tensioned between the bottom element 77 and the dry cell 75.

A removable transparent shell or protective casing 79 surrounds the electric bulb 68, and it is held in place by being fitted over a slight hublike elevation 80 forming part of the cover plate 65.

One or more drainage holes 81 are provided at the bottom of casing 58 to allow for the drainage of water that may have condensed in or otherwise entered the casing 58. An electric switch 82 serves to turn the light on or off. A cable connection 85 (see Fig. 1) is shown to indicate the alternative of using an outside source of electricity instead of the dry cell batteries.

The operation and use of the pelorus as such is well known and requires no explanation.

The manner in which the dial and the lubber lines or other markings are rendered visible by the lighting means according to one form of this invention, appears from Figures 3, 8, 10, 11. Some of the rays from bulb 68 pass upwardly through the light passage openings 35 into the translucent or transparent material of the disc-like member 36, which may be a suitable composition or plastic such as "Lucite." A portion of the light (see light rays $R_1$) of bulb 68 strikes the conical face 39 of the circular groove 37 and is deflected into a horizontal direction so as to light up the dial sufficiently for the required reading. The amount or intensity of the light thus emanating from the circumference of the member 36 can be modified by modifying the shape or extent of the overhanging portion 41 of the shielding plate 40, or a sector of the circumference can be blanked off or dimmed by a coat of paint or otherwise, or it can be blanked off as by the light shielding skirt 51 rotating with the alidade.

Some other portion of the light (see light rays $R_2$) emanating from the bulb 68 reaches the insert portions 19 and 21 of the frame 10 from underneath the dial member 30, passes through these insert portions and appears therein as a diffused light at the surface of the frame 10, furnishing a luminous background for the lubber lines or markings provided on these insert portions.

A modified form of the invention according to Fig. 4a shows a frame portion 11' which differs from the frame portion 11 of Fig. 4, in that it has a bevelled or inverted conical face 84 which bears the lubber lines such as the one shown at 85 or other desired fixed markings. A flat dial 86 is shown to marginally rest upon the frame portion 11' at the bottom of the bevelled face 84. Otherwise the construction is similar to that of Fig. 4, having arms 12' as part of the frame, a disc-like member 36' of transparent or translucent material, and a shielding plate 40'. In a modified form, both the dial graduations as well as the lubber lines are illuminated by the light emanating from the member 36'.

I claim:

1. A pelorus comprising a frame, having an annular marginal portion, a central hub portion, intermediate portions between the marginal and the hub portion to constitute light passage openings in said frame, and a threaded stem portion extending upwardly from said hub portion, a substantially non-transparent dial member having light passage openings overlying the light passage openings in said frame, and also having an upwardly extending outwardly threaded hollow central stem portion surrounding said inner stem portion, a light-conducting member overlying the light passage openings in said dial and having at its upper side an inverted conical light-deflecting face, light-shielding means overlying said light-conducting member, an alidade overlying said shielding means and rotatable about said threaded hollow stem portion, a lower nut on said hollow stem portion for fixing the alidade relative to said dial member, an upper nut on said inner stem portion for fixing said dial relative to said frame and a light source disposed underneath said dial from which light passing through said light passage openings and through said light-conducting member is adapted to indirectly light said dial by way of outward horizontal deflection from said inverted conical face.

2. The pelorus according to claim 1, with the addition of means for connecting said light-conducting member with said dial to constitute a structural unit.

3. The pelorus according to claim 1, in which said shielding means comprise a plate, with the addition of means for connecting said plate, said light conducting member, and said dial to constitute a structural unit.

4. The pelorus according to claim 1, in which the shielding means is a plate having a peripheral overhang with respect to said light-conducting member.

5. The pelorus according to claim 1, in which the marginal portion of the dial has an inverted conical marginal portion presenting the dial graduations at an angle to the horizontal direction of light emanating from said light-conducting member.

6. The pelorus according to claim 1, with the addition of at least one insert portion of light penetrable material disposed at a marginal point of the frame and extending therethrough from a point below to a point above the adjoining marginal portion of the dial, said insert portion being adapted to light a reference mark directly associated therewith.

7. A pelorus according to claim 1, with the addition of a bowl having a bottom opening, fixed to and surrounding the underside of the frame and enclosing said light source comprising an electric bulb, a dry-cell battery for the bulb, and means for mounting the bulb and the battery, comprising a cover plate over said opening, a bulb receiving fixture therein, a container portion extending downwardly from said opening, adapted to receive a dry-cell battery.

8. The pelorus according to claim 1, in which said light-conducting member is provided at its upper side with a groove presenting said conical light deflecting face.

9. As an article of manufacture for use in a pelorus the combination comprising a dial member having light passage openings in the central portion thereof, a light penetrable flat member overlying said openings and having at its upper side an inverted conical light-deflecting face, a light shielding plate overlying said member, and means for interconnecting said dial member, said flat member and said shielding plate.

10. The pelorus according to claim 1, in which the dial is flat and has graduations along its periphery, and in which the frame portion adjacent to the periphery of the dial has an inverted conical face provided with reference markings adapted to receive light radiating horizontally from said light-conducting member.

WILLIAM H. VAN GAASBEEK.